United States Patent
Chen et al.

(10) Patent No.: US 9,942,915 B2
(45) Date of Patent: Apr. 10, 2018

(54) WIRELESS COMMUNICATION SYSTEM, BASE STATION APPARATUS, TERMINAL DEVICE, AND TRANSMISSION METHOD

(71) Applicant: FUJITSU LIMITED, Kawasaki-shi, Kanagawa (JP)

(72) Inventors: Hongyang Chen, Kawasaki (JP); Yoshinori Tanaka, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/485,649

(22) Filed: Apr. 12, 2017

(65) Prior Publication Data
US 2017/0223724 A1 Aug. 3, 2017

Related U.S. Application Data

(63) Continuation of application No. PCT/JP2014/079374, filed on Nov. 5, 2014.

(51) Int. Cl.
*H04W 4/00* (2009.01)
*H04W 72/12* (2009.01)
(Continued)

(52) U.S. Cl.
CPC ........... *H04W 72/1263* (2013.01); *H04L 5/00* (2013.01); *H04W 16/14* (2013.01);
(Continued)

(58) Field of Classification Search
USPC .................. 370/331, 329; 455/450, 423, 447
See application file for complete search history.

(56) References Cited

U.S. PATENT DOCUMENTS

| 5,230,081 A * | 7/1993 | Yamada | H04W 64/00 455/447 |
| 5,386,588 A * | 1/1995 | Yasuda | H04W 52/24 455/423 |

(Continued)

FOREIGN PATENT DOCUMENTS

| EP | 2704482 A1 | 3/2014 |
| JP | 2002-124916 A | 4/2002 |

(Continued)

OTHER PUBLICATIONS

International Search Report issued for corresponding International Patent Application No. PCT/JP2014/079374, dated Feb. 3, 2015, with an English Translation.

(Continued)

*Primary Examiner* — David Q Nguyen
(74) *Attorney, Agent, or Firm* — Myers Wolin, LLC

(57) ABSTRACT

A wireless communication system includes a base station apparatus and a terminal device. The base station apparatus includes a processor that executes a process including mapping first control information concerning a first frequency band which needs a license to use for wireless communication, mapping second control information concerning a second frequency band which does not need the license to use for the wireless communication, and generating a control channel signal by arranging the first control information and the second control information in areas different from each other; and a transmitter that transmits the control channel signal generated by the processor to the terminal device.

16 Claims, 9 Drawing Sheets

(51) Int. Cl.
    *H04W 16/14*     (2009.01)
    *H04W 88/06*     (2009.01)
    *H04W 88/10*     (2009.01)
    *H04L 5/00*     (2006.01)
    *H04W 72/04*     (2009.01)
    *H04W 74/08*     (2009.01)

(52) U.S. Cl.
    CPC ....... *H04W 72/1289* (2013.01); *H04W 88/06* (2013.01); *H04W 88/10* (2013.01); *H04W 72/0406* (2013.01); *H04W 74/0808* (2013.01)

(56) References Cited

U.S. PATENT DOCUMENTS

| | | | |
|---|---|---|---|
| 7,200,399 B2* | 4/2007 | Gallagher | H04W 60/04 370/331 |
| 8,874,124 B2* | 10/2014 | Clegg | H04L 5/0062 455/450 |
| 2002/0045459 A1 | 4/2002 | Morikawa | |
| 2003/0115261 A1* | 6/2003 | Mohammed | H04L 63/083 709/203 |
| 2006/0121854 A1 | 6/2006 | Abhishek et al. | |
| 2007/0223508 A1 | 9/2007 | Nandagopalan | |
| 2014/0036853 A1 | 2/2014 | Kim et al. | |
| 2015/0049709 A1* | 2/2015 | Damnjanovic | H04L 5/0055 370/329 |
| 2015/0131536 A1 | 5/2015 | Kaur et al. | |

FOREIGN PATENT DOCUMENTS

| | | |
|---|---|---|
| JP | 2006-186992 A | 7/2006 |
| JP | 2008-508774 A | 3/2008 |
| JP | 2014-500685 A | 1/2014 |
| WO | 2006/013534 A2 | 2/2006 |
| WO | 2012/078565 A1 | 6/2012 |

OTHER PUBLICATIONS

3GPP TS 36.211 V12.3.0; "3rd Generation Partnership Project; Technical Specification Group Radio Access Network Evolved Universal Terrestrial Radio Access (E-UTRA); Physical channels and modulation (Release 12)" Sep. 2014.

Catt, "Resource allocation for NCT", Agenda Item: 7.3.1.4, 3GPP TSG RAN WG1 Meeting #72, R1-130042, St. Julian's, Malta, Jan. 28-Feb. 1, 2013.

NEC Group, "Requirements and necessary enhancements for Rel-12 NCT" Agenda Item: 6.3.1.3, 3GPP TSG RAN WG1 Meeting #71, R1-124856, New Orleans, USA, Nov. 12-16, 2012.

Extended European search report with supplementary European search report and the European search opinion issued by the European Patent Office for corresponding European Patent Application No. 14905386.0, dated Sep. 8, 2017.

CMCC—3GPP TSG-RAN WG1, Meeting #78bis, Ljubljana, Slovenia, Oct. 6-10, 2014, R1-143952; "Transmission of Control Signaling in Unlicensed Band", Document for Discussion and Decision. [cited in EESR for EP Application No. 14905386.0, dated Sep. 9, 2017].

Alcatel-Lucent, Alcatel-Lucent Shanghai Bell—3GPP TSG-RAN WG1, Meeting #78bis, Ljubljana, Slovenia, Oct. 6-10, 2014, R1-144081; "High Level Discussion on the Potential Solutions for Licensed-Assisted Access Using LTE", Document for Discussion and Decision. [cited in EESR for EP Application No. 14905386.0, dated Sep. 9, 2017].

Examination report No. 1 issued by IP Australia for corresponding Australian Patent Application No. 2014410902, dated Nov. 21, 2017.

Office Action issued by the Canadian Intellectual Property Office for corresponding Canadian Patent Application No. 2,965,947, dated Feb. 20, 2018.

* cited by examiner

WIRELESS COMMUNICATION SYSTEM, BASE STATION APPARATUS, TERMINAL DEVICE, AND TRANSMISSION METHOD

CROSS-REFERENCE TO RELATED APPLICATION

This application is a continuation of International Application No. PCT/JP2014/079374, filed on Nov. 5, 2014 and designating the U.S., the entire contents of which are incorporated herein by reference.

FIELD

The present invention relates to a wireless communication system, a base station apparatus, a terminal device, and a transmission method.

BACKGROUND

In recent years, in a wireless communication system using long term evolution (LTE) for example, taking measures to accommodate more traffic and improve communication quality has been desired because the traffic is steadily increasing. Thus, it has been studied to use the LTE technology in an unlicensed band (hereinafter referred to as "U-band") that is used for a wireless local area network (LAN) and the like for example and needs no license.

Specifically, there is a technology referred to as licensed assisted access (LAA) that uses the LTE technology in the U-band. The LAA is a technology to transmit and receive data in the U-band by subsidiarily using a licensed band (hereinafter referred to as "L-band") that is used in a wireless communication system such as a mobile telephone network for example and needs a license.

In the case that the LAA is employed, it has been considered, for example, that control data and the like is transmitted and received in the L-band and user data of best-effort type and the like is transmitted and received in the U-band. Then, as a control channel of downlink that transmits the control data to a terminal device from a base station apparatus, an enhanced-physical downlink control channel (EPDCCH) that has been standardized by 3GPP and others is available, for example. The EPDCCH is different from a physical-downlink control channel (PDCCH) that extends over the entire frequency band of the downlink, and as with a physical-downlink shared channel (PDSCH), uses a part of the frequency band as the control channel.

Incidentally, because the L-band is a frequency band that needs a license, a telecommunications carrier who has acquired the license occupies a specific frequency band that belongs to the L-band and the interference with the communications in other wireless communication systems does not occur. Meanwhile, because the U-band needs no license and is also used by other wireless communication systems such as a wireless LAN, the LAA that a different telecommunications carrier operates, and others for example, when the wireless communication using the U-band is performed, the interference with the communications in the other wireless communication systems can occur. Thus, when the LAA is employed, it is preferable that a scheme that prevents the interference with other communications be implemented. That is, like carrier sense for example, it is conceivable that, when a device performs wireless communication, the listen before talk (LBT) that checks whether the wireless communication is being performed by the other device is implemented. When implementing the LBT, the device that performs transmission detects received energy in the frequency band used for the transmission and determines whether the transmission by the other device is being executed. If the transmission by the other device is not being executed, then this frequency band is used and the transmission of data is executed. Accordingly, this makes it possible to prevent the interference caused by the collision of communications between the devices that transmit data in the identical frequency band.

Patent Literature 1: Japanese Laid-open Patent Publication No. 2006-186992

Patent Literature 2: Japanese National Publication of International Patent Application No. 2014-500685

Patent Literature 3: Japanese Laid-open Patent Publication No. 2002-124916

Patent Literature 4: Japanese National Publication of International Patent Application No. 2008-508774

Non-Patent Literature 1: 3GPP TS 36.211 V12.3.0 September 2014

As described above, when performing communication using the U-band, it is preferable that the LBT be executed to prevent the interference with the communications in the other wireless communication systems. Then, when the LBT is executed, depending on the execution result, it is determined whether to actually transmit data via the U-band. That is, as a result of the LBT, when it is checked that the other device is not transmitting data, the transmission of data via the U-band is executed, and when the other device is transmitting data, the transmission of data via the U-band is deferred. Accordingly, until the execution result of the LBT is obtained, it is not determined whether the data is actually transmitted via the U-band.

Because of this, there is a problem in that, concerning the mapping of downlink control information (DCI) indicative of the allocation of data of downlink to a control channel for example, it is difficult for the base station apparatus to keep the DCI about the L-band and the U-band mapped to the control channel in advance.

That is, although the allocation of the data of downlink is determined in advance on the L-band by scheduling, it is not determined, on the U-band, whether the data is actually allocated to the downlink until the execution result of LBT is obtained. Consequently, when the base station apparatus keeps the DCI about the L-band and the U-band mapped to the control channel such as an EPDCCH in advance for example, depending on the execution result of the LBT concerning the U-band, the data is not allocated as per the DCI in some cases.

Specifically, when the DCI about the L-band and the U-band is mapped to the EPDCCH in advance for example, if the transmission of data via the U-band is deferred due to the execution result of LBT, the allocation of data for the U-band is no longer present. Accordingly, the DCI mapped in advance is no longer appropriate, and the DCI about only the L-band is to be mapped to the EPDCCH again.

As in the foregoing, because the presence of the allocation of data for the U-band is not determined until the execution result of LBT is obtained, it is difficult for the base station apparatus to keep the DCI mapped for the control channel. Thus, it is also conceivable to map the DCI about the L-band and the U-band to the control channel, after having obtained the execution result of LBT. In this case, however, in order to complete the mapping of the DCI about the L-band and the U-band in a short time before the sub-frame at which the data is actually transmitted, the need to speed up the mapping processing of the DCI arises. As a result, the hardware of high-performance or the like is desired, and that leads to an increase in cost.

SUMMARY

According to an aspect of an embodiment of the invention, a wireless communication system includes: a base station apparatus; and a terminal device. The base station apparatus includes: a processor that executes a process including mapping first control information concerning a first frequency band which needs a license to use for wireless communication, mapping second control information concerning a second frequency band which does not need the license to use for the wireless communication, and generating a control channel signal by arranging the first control information and the second control information in areas different from each other; and a transmitter that transmits the control channel signal generated by the processor to the terminal device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

The following describes exemplary embodiments of a wireless communication system, a base station apparatus, a terminal device, and a transmission method disclosed in the present application in detail with reference to the accompanying drawings. It is noted that the present invention is not limited by the embodiments.

[a] First Embodiment

Figure 1:
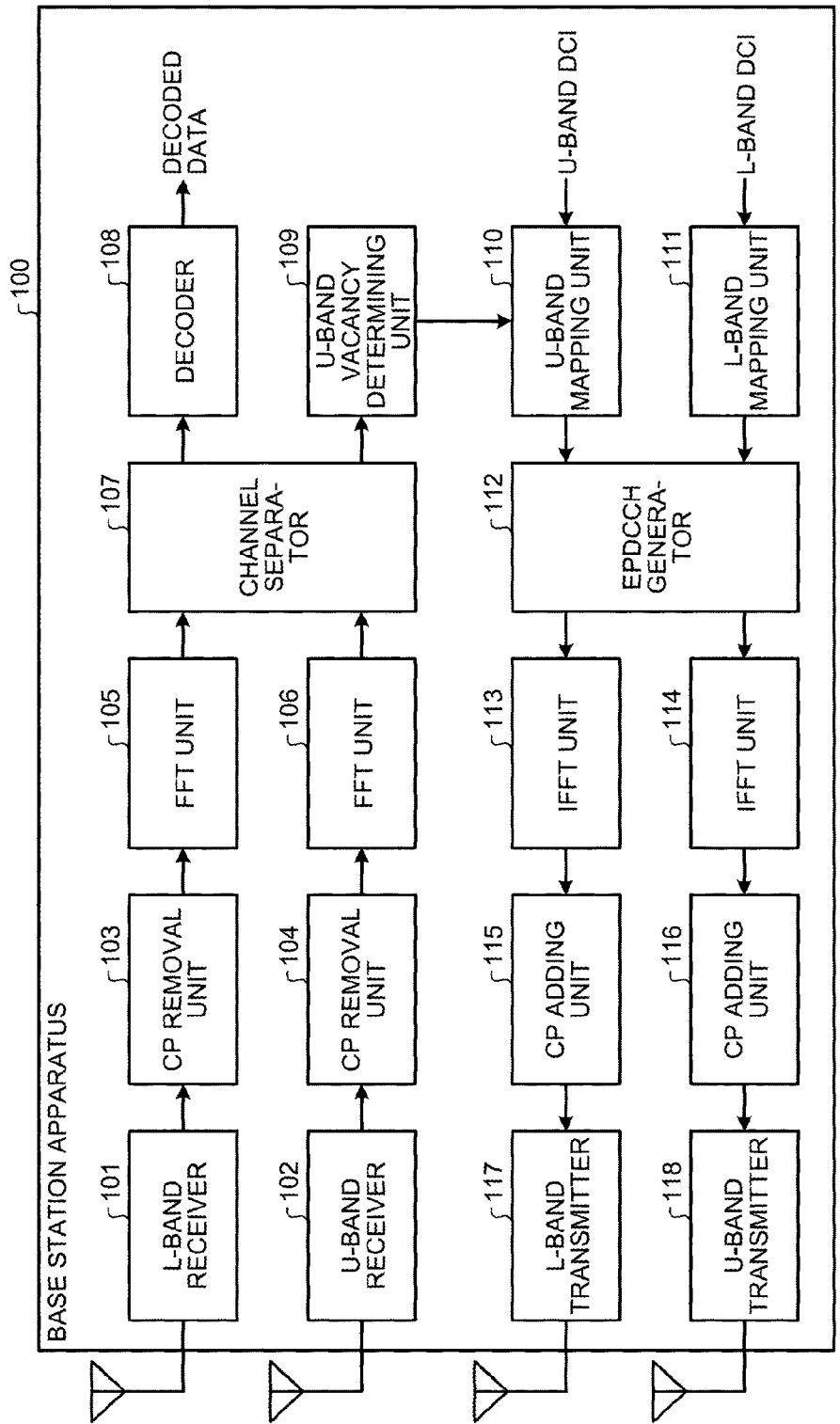
FIG. 1 is a block diagram illustrating a configuration of a base station apparatus according to a first embodiment.

FIG. 1 is a block diagram illustrating a configuration of a base station apparatus 100 according to a first embodiment. The base station apparatus 100 illustrated in FIG. 1 includes an L-band receiver 101, a U-band receiver 102, cyclic prefix (CP) removal units 103 and 104, fast Fourier transform (FFT) units 105 and 106, a channel separator 107, a decoder 108, and a U-band vacancy determining unit 109. These processing units are the processing units on the receiving side of the base station apparatus 100. The base station apparatus 100 further includes a U-band mapping unit 110, an L-band mapping unit 111, an EPDCCH generator 112, inverse fast Fourier transform (IFFT) units 113 and 114, CP adding units 115 and 116, an L-band transmitter 117, and a U-band transmitter 118. These processing units are the processing units on the transmitting side of the base station apparatus 100.

The L-band receiver 101 receives a signal of an L-band. That is, the L-band receiver 101 receives a signal of a frequency band that needs a license such as 2 GHz band, for example.

The U-band receiver 102 receives a signal of a U-band. That is, the U-band receiver 102 receives a signal of a frequency band that needs no license such as 5 GHz band, for example.

The CP removal units 103 and 104 each remove CP, which has been added between orthogonal frequency division multiplexing (OFDM) symbols, from a received signal of the L-band or the U-band. That is, when wireless communication in an OFDM scheme is performed, the CP for preventing inter-symbol interference is added between the OFDM symbols constituting a wireless signal, and thus the CP removal units 103 and 104 remove the CP. In the first embodiment, a case that the wireless communication in the OFDM scheme is performed will be described. The present invention, however, is applicable to also the cases that wireless communication other than the OFDM scheme is performed. Accordingly, when the wireless communication other than the OFDM scheme is performed, the CP removal units 103 and 104 can be omitted.

The FFT units 105 and 106 each perform fast Fourier transform on the received signal of the L-band or the U-band and acquire signals of a plurality of sub-carriers having frequencies orthogonal to one another. That is, the FFT units 105 and 106 acquire, by transforming the received signal in a time domain into the signal in a frequency domain, the signal of a plurality of sub-carriers. The FFT units 105 and 106 also are, as with the above-described CP removal units 103 and 104, the processing units that execute the processing in the case that the wireless communication in the OFDM scheme is performed, and thus can be omitted in the case that the wireless communication other than the OFDM scheme is performed.

The channel separator 107 separates the signal of a plurality of sub-carriers in the L-band and the U-band into signals of respective channels. That is, the signals of a plurality of channels are frequency-multiplexed and time-multiplexed in the received signals of the L-band and the U-band, and thus the channel separator 107 separates the received signals of the respective bands into the signals of a data channel and a control channel for each terminal device, for example.

The decoder 108 decodes the signal of each channel obtained by the channel separator 107 and obtains decoded data.

The U-band vacancy determining unit 109, when the data to be transmitted by using the U-band occurs, detects received energy in the channels of the U-band and determines whether the U-band is vacant. That is, when the data to be transmitted by using the U-band occurs, the U-band vacancy determining unit 109 executes carrier sense. Specifically, the U-band vacancy determining unit 109 determines that the U-band is in use by the other devices when the received energy in the U-band is equal to or higher than a certain threshold. The U-band vacancy determining unit 109 further determines that the U-band is vacant when the received energy in the U-band is below the certain threshold.

Furthermore, the U-band vacancy determining unit 109 continues to execute the carrier sense periodically for a certain period after having determined that the U-band is vacant. That is, the U-band vacancy determining unit 109, even after having determined that the U-band is vacant, continues to execute the carrier sense periodically between a certain time such as distributed inter-frame space (DIFS) for example and a back-off time that is determined randomly for each device.

Then, between the DIFS and the back-off time, when the U-band vacancy determining unit 109 continues to determine that the U-band is vacant, the U-band vacancy determining unit 109 determines to transmit data by using the U-band and notifies the U-band mapping unit 110 of that. Meanwhile, when the U-band vacancy determining unit 109 determines that the U-band is in use by the other devices between the DIFS and the back-off time, the U-band vacancy determining unit 109 determines to defer the data transmission by using the U-band and executes the carrier sense again after the elapse of a certain time.

The U-band mapping unit 110, when the data to be transmitted by using the U-band occurs, maps U-band DCI indicative of the allocation of data of downlink in the U-band to a resource element group (REG) to be a constituent element of the control channel. That is, the U-band mapping unit 110 generates the U-band DCI that indicates, for each sub-band in the U-band, which sub-band of frequency that stores data is addressed to which terminal device. Then, when the U-band mapping unit 110 is notified from the U-band vacancy determining unit 109 that the data is transmitted by using the U-band, the U-band mapping unit 110 outputs the U-band DCI mapped to the REG in advance to the EPDCCH generator 112. Meanwhile, when the U-band mapping unit 110 is not notified from the U-band vacancy determining unit 109 that the data is transmitted by using the U-band, the U-band mapping unit 110 temporarily retains, without outputting, the U-band DCI mapped to the REG in advance.

As the U-band DCI, in addition to a downlink (DL) assignment indicative of the above-described allocation of data of downlink, an uplink (UL) grant to permit the transmission of uplink using the U-band to a terminal device may also be included.

The L-band mapping unit 111, when the data to be transmitted by using the L-band occurs, maps L-band DCI indicative of the allocation of data of downlink in the L-band to an REG. That is, the L-band mapping unit 111 generates the L-band DCI that indicates, for each sub-band in the L-band, which sub-band of frequency that stores data is addressed to which terminal device. Then, regardless of the presence of transmission of data using the U-band, the L-band mapping unit 111 outputs the L-band DCI mapped to the REG to the EPDCCH generator 112.

The EPDCCH generator 112 arranges, in an EPDCCH area of the L-band, the U-band DCI and the L-band DCI that are output from the U-band mapping unit 110 and the L-band mapping unit 111, respectively. Specifically, the EPDCCH generator 112 allocates the REGs, in which the U-band DCI and the L-band DCI are mapped, to sub-carriers of frequencies different from each other in the EPDCCH area of the L-band. Accordingly, even when the L-band DCI is output from the L-band mapping unit 111 while the U-band DCI is not output from the U-band mapping unit 110 for example, the EPDCCH generator 112 can allocate the L-band DCI to the sub-carrier in the EPDCCH area independently.

The EPDCCH generator 112 then outputs the U-band DCI and the L-band DCI that are allocated to the sub-carriers of the L-band to the IFFT unit 113 together with the data allocated to the other sub-carriers of the L-band. The EPDCCH generator 112 further outputs the data allocated to the sub-carriers of the U-band to the IFFT unit 114.

The IFFT units 113 and 114 each perform inverse fast Fourier transform on the data for each sub-carrier of the L-band or the U-band and acquire the OFDM symbols in the time domain. That is, the IFFT units 113 and 114 acquire the OFDM symbols, by transforming the data in the frequency domain allocated to each sub-carrier into the signal in the time domain. The IFFT units 113 and 114 are, as with the above-described CP removal units 103 and 104 and the FFT units 105 and 106, the processing units that execute the processing in the case that the wireless communication in the OFDM scheme is performed, and thus can be omitted in the case that the wireless communication other than the OFDM scheme is performed.

The CP adding units 115 and 116 each add the CP between the OFDM symbols of the L-band or the U-band and generate a transmission signal of the L-band or the U-band. The CP adding units 115 and 116 also are, as with the above-described IFFT units 113 and 114, the processing units that execute the processing in the case that the wireless communication in the OFDM scheme is performed, and thus can be omitted in the case that the wireless communication other than the OFDM scheme is performed.

The L-band transmitter 117 transmits the transmission signal of the L-band. That is, the L-band transmitter 117 transmits a transmission signal of a frequency band that needs a license such as 2 GHz band, for example.

The U-band transmitter 118 transmits the transmission signal of the U-band. That is, the U-band transmitter 118 transmits a transmission signal of a frequency band that needs no license such as 5 GHz band, for example.

Figure 2:
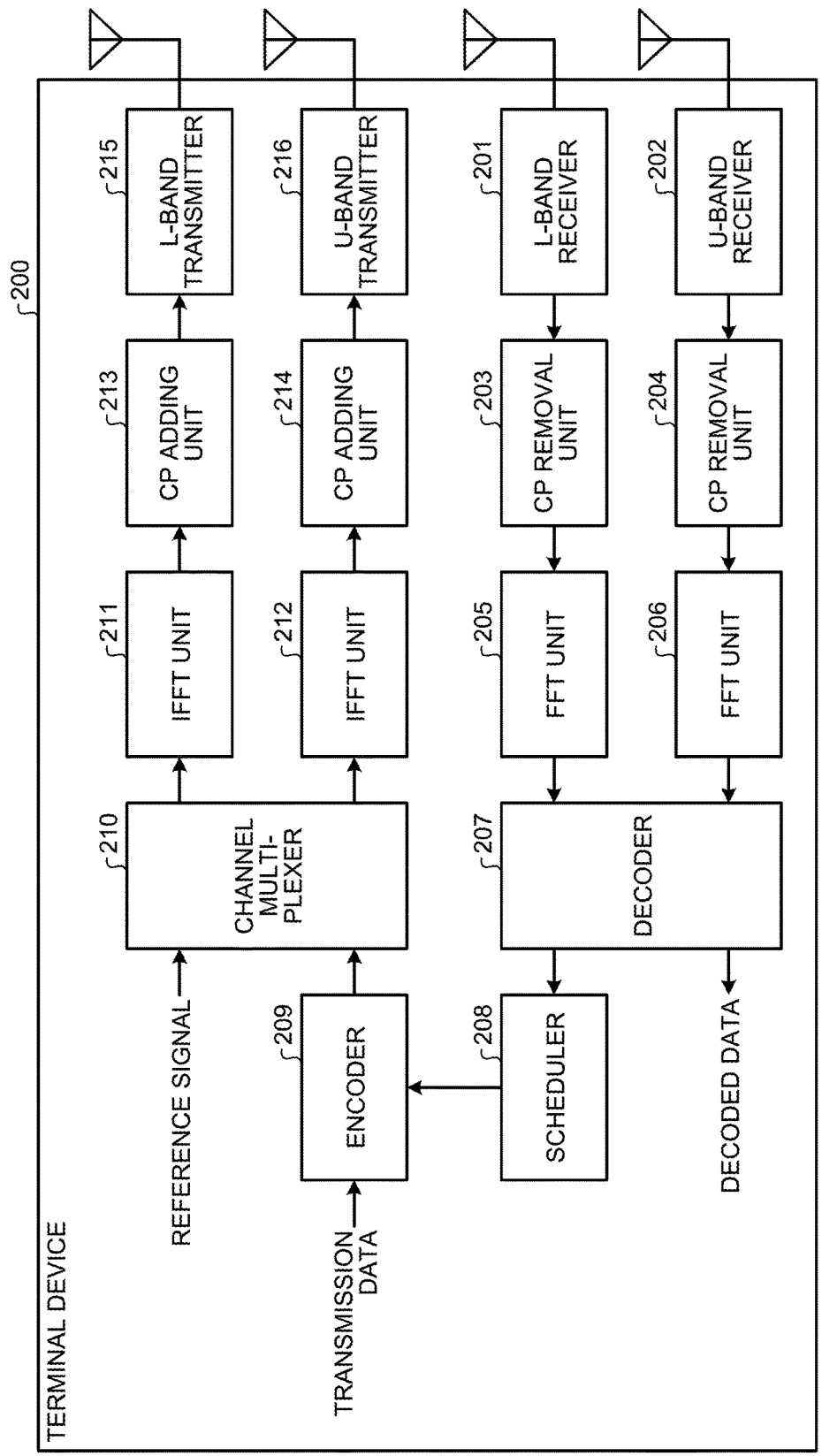
FIG. 2 is a block diagram illustrating a configuration of a terminal device in the first embodiment.

Next, the configuration of a terminal device that receives the signal transmitted from the base station apparatus 100 will be described. FIG. 2 is a block diagram illustrating the configuration of a terminal device 200 in the first embodiment. The terminal device 200, as illustrated in FIG. 2, includes an L-band receiver 201, a U-band receiver 202, CP removal units 203 and 204, FFT units 205 and 206, and a decoder 207. These processing units are the processing units on the receiving side of the terminal device 200. The terminal device 200 further includes a scheduler 208, an encoder 209, a channel multiplexer 210, IFFT units 211 and 212, CP adding units 213 and 214, an L-band transmitter 215, and a U-band transmitter 216. These processing units are the processing units on the transmitting side of the terminal device 200.

The L-band receiver 201 receives a signal of the L-band. That is, the L-band receiver 201 receives a signal of a frequency band that needs a license such as 2 GHz band, for example.

The U-band receiver 202 receives a signal of the U-band. That is, the U-band receiver 202 receives a signal of a frequency band that needs no license such as 5 GHz band, for example.

The CP removal units 203 and 204 each remove the CP, which has been added between the OFDM symbols, from the received signal of the L-band or the U-band. The CP removal units 203 and 204 also are, as with the above-described CP removal units 103 and 104, the processing units that execute the processing in the case that the wireless communication in the OFDM scheme is performed, and thus can be omitted in the case that the wireless communication other than the OFDM scheme is performed.

The FFT units 205 and 206 each perform fast Fourier transform on the received signal of the L-band or the U-band and acquire signals of a plurality of sub-carriers having frequencies orthogonal to one another. The FFT units 205 and 206 also are, as with the above-described CP removal units 203 and 204, the processing units that execute the processing in the case that the wireless communication in the OFDM scheme is performed, and thus can be omitted in the case that the wireless communication other than the OFDM scheme is performed.

The decoder 207 decodes the signals of a plurality of sub-carriers of the L-band and of the U-band, and obtains decoded data that is addressed to the terminal device 200. That is, the decoder 207 decodes, out of the signals of a plurality of sub-carriers, the signals allocated to the sub-carriers in the EPDCCH area of the L-band, and obtains the L-band DCI and the U-band DCI. The decoder 207 then refers to the L-band DCI, and out of the sub-bands in the L-band, decodes the signals of the sub-carriers that are included in the sub-bands allocated to the terminal device 200. In the same manner, the decoder 207 refers to the U-band DCI, and out of the sub-bands in the U-band, decodes the signals of the sub-carriers that are included in the sub-bands allocated to the terminal device 200.

At this time, the decoder 207 refers to the DL assignment included in the L-band DCI and the U-band DCI, and determines in which sub-carriers the data that is addressed to the terminal device 200 is being stored. Furthermore, the decoder 207, when the UL grant is included in the U-band DCI, outputs the UL grant to the scheduler 208.

The scheduler 208, once the UL grant is output from the decoder 207, determines, based on the UL grant, the sub-frame at which the data transmission of uplink is permitted, and executes scheduling for transmitting the data at the sub-frame. Specifically, the scheduler 208 determines, to be the sub-frame at which the data transmission of uplink is permitted, the sub-frame that is a certain number of sub-frames after the sub-frame at which the UL grant was received, for example.

The encoder 209 encodes, in accordance with the scheduling in the scheduler 208, the transmission data of uplink. The encoder 209 then outputs the obtained encoded data to the channel multiplexer 210.

The channel multiplexer 210 performs frequency multiplexing and time multiplexing on the encoded data output from the encoder 209 and on a reference signal for the line quality determination of the uplink for example, and allocates them to the respective channels of the L-band and the U-band. That is, the channel multiplexer 210 allocates the encoded data and the reference signal to a plurality of sub-carriers and a plurality of sub-frames in the L-band and the U-band.

The IFFT units 211 and 212 each perform inverse fast Fourier transform on the data for each sub-carrier of the L-band or the U-band and acquire the OFDM symbols in the time domain. That is, the IFFT units 211 and 212 acquire the OFDM symbols, by transforming the data in the frequency domain allocated to each sub-carrier into the signal in the time domain. The IFFT units 211 and 212 are, as with the above-described CP removal units 203 and 204 and the FFT units 205 and 206, the processing units that execute the processing in the case that the wireless communication in the OFDM scheme is performed, and thus can be omitted in the case that the wireless communication other than the OFDM scheme is performed.

The CP adding units 213 and 214 each add the CP between the OFDM symbols of the L-band or the U-band and generate a transmission signal of the L-band or the U-band. The CP adding units 213 and 214 also are, as with the above-described IFFT units 211 and 212, the processing units that execute the processing in the case that the wireless communication in the OFDM scheme is performed, and thus can be omitted in the case that the wireless communication other than the OFDM scheme is performed.

The L-band transmitter 215 transmits the transmission signal of the L-band. That is, the L-band transmitter 215 transmits a transmission signal of a frequency band that needs a license such as 2 GHz band, for example.

The U-band transmitter 216 transmits the transmission signal of the U-band. That is, the U-band transmitter 216 transmits a transmission signal of a frequency band that needs no license such as 5 GHz band, for example.

Figure 3:
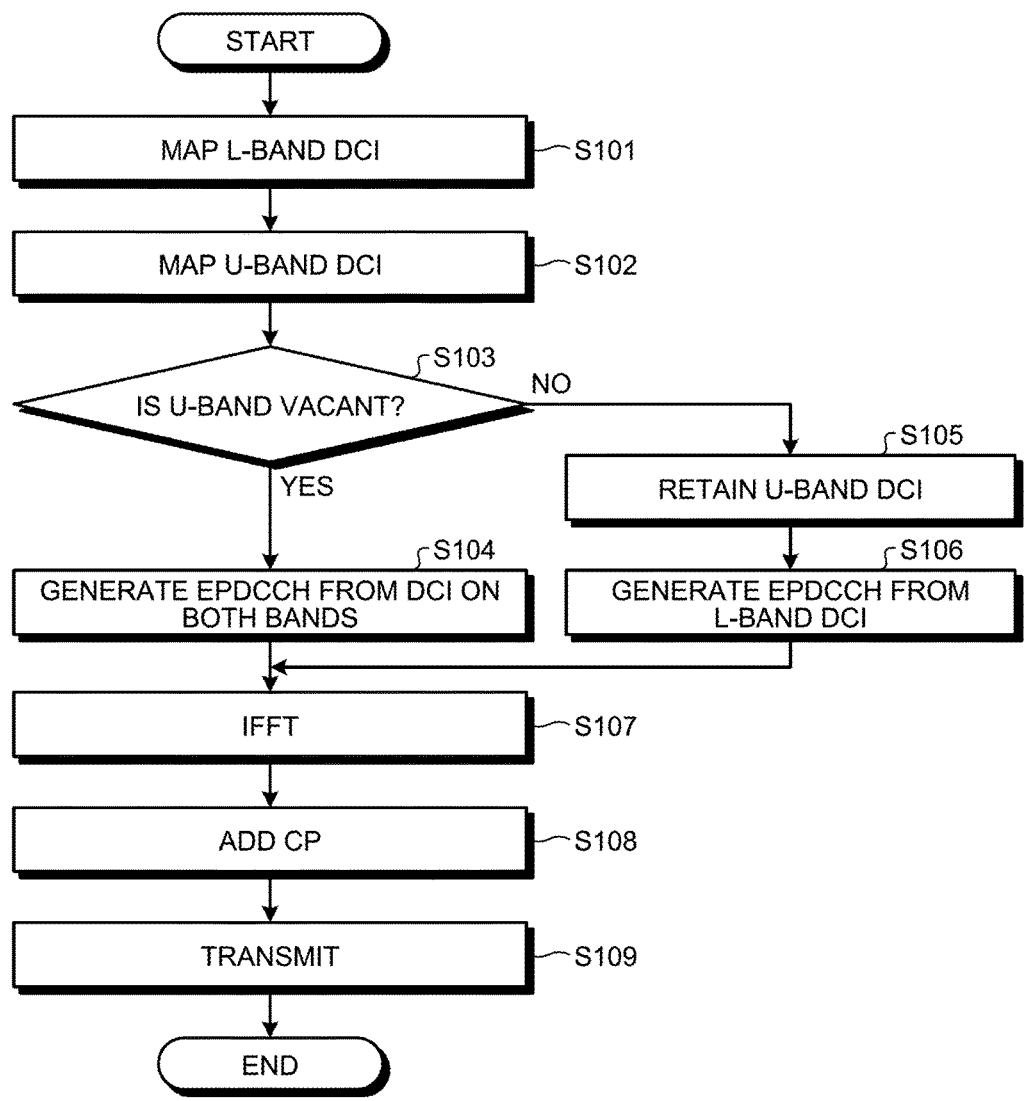
FIG. 3 is a flowchart illustrating transmission processing performed in the first embodiment.

Next, the transmission processing of DCI performed by the base station apparatus 100 thus configured will be described with reference to the flowchart illustrated in FIG. 3.

In the base station apparatus 100, when data to be transmitted to a terminal device such as the terminal device 200 occurs, the DCI that includes DL assignment indicative of the allocation location of such data in the downlink is generated. Specifically, as for the data to be transmitted by using the L-band, the L-band DCI indicative of sub-bands in the L-band to which the respective data is allocated is mapped to the REG by the L-band mapping unit 111 (Step S101). In the same manner, as for the data to be transmitted by using the U-band, the U-band DCI indicative of sub-bands in the U-band to which the respective data is allocated is mapped to the REG by the U-band mapping unit 110 (Step S102).

These mapping of DCI may be executed at any timing that is before the timing that the DCI is actually transmitted. That is, when the data to be transmitted occurs for example, the mapping of the respective DCI may be executed instantaneously. Because the L-band DCI and the U-band DCI are mapped to the REGs independently from each other, when the data is transmitted by using only the L-band or only the U-band, one of the DCI corresponding to the band to be used may be mapped to the REG. In the following description, the explanation is continued assuming that the data is transmitted by using both the L-band and the U-band.

When the data to be transmitted by using the U-band occurs, in parallel with the mapping of the U-band DCI, the carrier sense is executed by the U-band vacancy determining unit 109. That is, by the U-band vacancy determining unit 109, the received energy of received signals received by the U-band receiver 102 is detected and whether the U-band is vacant is determined (Step S103). Specifically, when the received energy in the U-band is equal to or higher than a certain threshold, it is determined that the other device is transmitting and the U-band is not vacant, and when the received energy in the U-band is below the certain threshold, it is determined that there is no device that is transmitting and the U-band is vacant.

As a result of the determination by the U-band vacancy determining unit 109, when the U-band is vacant (Yes at Step S103), the U-band DCI that has been mapped by the U-band mapping unit 110 is output to the EPDCCH generator 112. Furthermore, the L-band DCI that has been mapped by the L-band mapping unit 111 is output to the EPDCCH generator 112 as needed, regardless of the result of the determination by the U-band vacancy determining unit 109. Then, by the EPDCCH generator 112, the U-band DCI and the L-band DCI are arranged in the EPDCCH area of the L-band. Specifically, the REGs in which the U-band DCI and the L-band DCI have been mapped are allocated to sub-carriers of frequencies different from each other in the EPDCCH area of the L-band. Accordingly, the EPDCCH in which the L-band DCI and the U-band DCI have been arranged to frequencies different from each other is generated (Step S104).

Meanwhile, as the result of the determination by the U-band vacancy determining unit 109, if the U-band is not vacant (No at Step S103), the U-band DCI that has been mapped by the U-band mapping unit 110 is retained as is (Step S105). In contrast, the L-band DCI that has been mapped by the L-band mapping unit 111 is output to the EPDCCH generator 112 as needed regardless of the result of the determination by the U-band vacancy determining unit 109. Then, by the EPDCCH generator 112, the L-band DCI is arranged in the EPDCCH area of the L-band. Specifically, the REG in which the L-band DCI has been mapped is allocated to a sub-carrier in the EPDCCH area of the L-band. Accordingly, the EPDCCH that includes the L-band DCI is generated (Step S106).

As just described, because the L-band DCI and the U-band DCI are arranged to the frequencies different from each other in the EPDCCH area, regardless of the presence of transmission of the U-band DCI, the L-band DCI can be arranged to the EPDCCH independently. Furthermore, the U-band DCI is retained even when the U-band is not vacant, and thus, at the time the U-band becomes vacant, the retained U-band DCI can be arranged to the EPDCCH as is. As a result, by keeping the L-band DCI and the U-band DCI mapped in advance, the EPDCCH can be generated in a short time.

The L-band DCI and the U-band DCI allocated to the sub-carriers constituting the EPDCCH of the L-band are output to the IFFT unit 113, together with the data allocated to the other sub-carriers of the L-band in accordance with the L-band DCI. Furthermore, the data allocated to the respective sub-carriers of the U-band in accordance with the U-band DCI is output to the IFFT unit 114. Then, by the IFFT units 113 and 114, the inverse fast Fourier transform is performed on the data allocated to the respective sub-carriers (Step S107), and the respective OFDM symbols of the L-band and the U-band are generated.

To the generated OFDM symbols, the CP is added by the CP adding units 115 and 116 (Step S108), and the obtained transmission signals are transmitted from the respective L-band transmitter 117 and the U-band transmitter 118 (Step S109).

The signals transmitted from the base station apparatus 100 are received by the terminal device 200 and the EPDCCH of the L-band is decoded by the decoder 207, and thus the sub-carriers to which the data addressed to the terminal device 200 has been allocated are understood. That is, the location of the data addressed to the terminal device 200 in the L-band is understood from the L-band DCI of the EPDCCH, and the location of the data addressed to the terminal device 200 in the U-band is understood from the U-band DCI of the EPDCCH. Then, by the decoder 207, the data addressed to the terminal device 200 in the L-band and the U-band is decoded. When the U-band DCI includes UL grant, by the scheduler 208, the scheduling of the uplink in accordance with the UL grant is executed.

Figure 4:
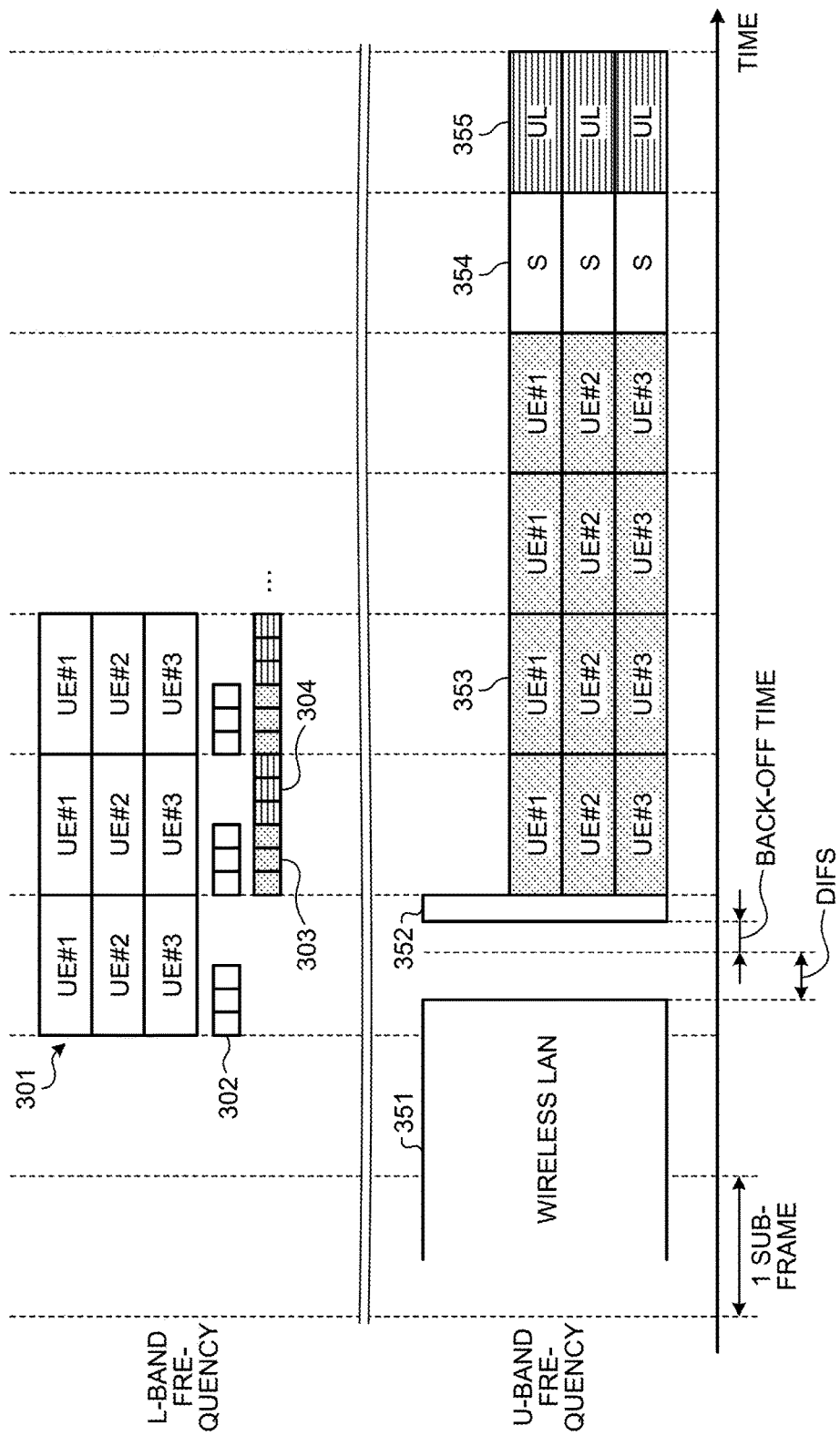
FIG. 4 is a diagram illustrating a specific example of a sub-frame configuration in the first embodiment.

Next, a specific example of the sub-frame configuration in the wireless communication system in the first embodiment will be described with reference to FIG. 4. FIG. 4 is a diagram illustrating in time series the data to be transmitted by using the respective frequency bands of the L-band and the U-band.

In the L-band, data 301 in which the data addressed to three terminal devices UE #1 to #3 has been frequency-multiplexed is transmitted by a base station apparatus. Then, DL assignment 302 concerning the data 301 is transmitted in the sub-frame identical to the respective data. The DL assignment 302 is the L-band DCI, and is arranged to the frequency in the EPDCCH area for example and transmitted. The terminal devices UE #1 to #3 each can understand, by receiving and decoding the DL assignment 302 in the EPDCCH area, which sub-band in the L-band the data addressed to the terminal devices themselves is allocated to.

In the frequency in the EPDCCH area of the L-band different from the frequency to which the DL assignment 302 is arranged, the U-band DCI is arranged and transmitted. That is, DL assignment 303 concerning the U-band and UL grant 304 are arranged to the frequency in the EPDCCH area. The terminal devices UE #1 to #3 each can understand, by receiving and decoding the DL assignment 303 in the EPDCCH area, which sub-band in the U-band the data addressed to the terminal devices themselves is allocated to. The terminal devices UE #1 to #3 can further understand, by receiving and decoding the UL grant 304 in the EPDCCH area, the presence of permission of data transmission of uplink using the U-band.

As just described, in the EPDCCH area of the L-band, the L-band DCI 302 and the U-band DCI 303 and 304 are arranged to the frequencies different from each other and transmitted. Thus, the base station apparatus can keep the L-band DCI 302 and the U-band DCI 303 and 304 mapped in advance and, depending on the result of carrier sense, transmit only the L-band DCI 302 and transmit the DCI on both bands.

Meanwhile, in the U-band, by the transmission of data 351 by a wireless LAN for example, the frequency band of the U-band may be occupied. When the data to be transmitted using the U-band from the base station apparatus occurs under this condition, the base station apparatus periodically detects received energy in the U-band and determines whether the U-band is vacant. Then, when the U-band is vacant after the transmission of the data 351 by the wireless LAN is finished, the base station apparatus continues to perform the carrier sense periodically during a certain DIFS also and further continues to perform the carrier sense during the back-off time also that is randomly determined for each base station apparatus. As a result, when the U-band is vacant, the base station apparatus transmits a dummy signal 352 up to the beginning of a subsequent sub-frame. The dummy signal 352 is a signal that occupies the frequency band of the U-band, and is transmitted to reserve the use of the U-band. That is, in order to prevent it from being determined that the U-band is vacant as a result of carrier sense executed by other devices, the dummy signal 352 is transmitted in the U-band.

Then, from the sub-frame subsequent to the transmitted dummy signal 352, data 353 in which the data addressed to the terminal devices UE #1 to #3 has been frequency-multiplexed is transmitted by the base station apparatus. The DL assignment 303 concerning the data 353, as in the foregoing, is transmitted by using the EPDCCH of the L-band in the sub-frame identical to the respective data. Furthermore, after the sub-frames in which the data 353 of downlink is transmitted, a special sub-frame 354 is provided, and in the sub-frame after the special sub-frame 354, data 355 of uplink is transmitted. As for the data 355 of uplink, the terminal devices UE #1 to #3 execute scheduling by using the UL grant 304 transmitted using the EPDCCH of the L-band, and in accordance with the scheduling, the data 355 is transmitted.

As in the foregoing, according to the first embodiment, the L-band DCI and the U-band DCI are arranged to the frequencies different from each other in the EPDCCH area of the L-band and transmitted. Consequently, as a result of carrier sense, even when the transmission of data using the U-band is deferred, the L-band DCI mapped in advance can be transmitted independently from the U-band DCI. Furthermore, the U-band DCI mapped in advance is retained temporarily, and as a result of carrier sense, when the transmission of data using the U-band is executed, the retained U-band DCI can be transmitted. Accordingly, when the communication is performed by using a frequency band that needs a license and a frequency band that needs no license, it is possible to transmit the control information efficiently.

In the above-described first embodiment, it has been exemplified that the L-band DCI and the U-band DCI are arranged to different frequencies in the EPDCCH area of the L-band. However, the same effect can be obtained as long as they are being arranged to different areas.

[b] Second Embodiment

The feature of a second embodiment is the point that the DL assignment indicative of the allocation of data of downlink in the U-band and the UL grant indicative of the transmission permission of data of uplink in the U-band are arranged to different frequencies.

The configurations of the base station apparatus and the terminal device according to the second embodiment are the same as those of the base station apparatus 100 and the terminal device 200 in the first embodiment, and thus the explanations thereof are omitted. In the second embodiment, the operation of the EPDCCH generator 112 of the base station apparatus 100 is different from that of the first embodiment.

The EPDCCH generator 112 arranges, in an EPDCCH area of the L-band, the U-band DCI and the L-band DCI that are output from the U-band mapping unit 110 and the L-band mapping unit 111, respectively. At this time, the EPDCCH generator 112 allocates the REGs, in which the U-band DCI and the L-band DCI are mapped, to sub-carriers of frequencies different from each other in the EPDCCH area of the L-band. The EPDCCH generator 112 further allocates the REGs, in which the DL assignment and the UL grant out of the U-band DCI are mapped, to sub-carriers of frequencies different from each other in the EPDCCH area of the L-band.

That is, in the second embodiment, the L-band DCI, the DL assignment of the U-band, and the UL grant of the U-band are arranged to frequencies different from one another. Accordingly, even when the DL assignment of the U-band is output from the U-band mapping unit 110 while the UL grant of the U-band is not output for example, the EPDCCH generator 112 can allocate the L-band DCI and the DL assignment of the U-band to the sub-carriers in the EPDCCH area.

Figure 5:
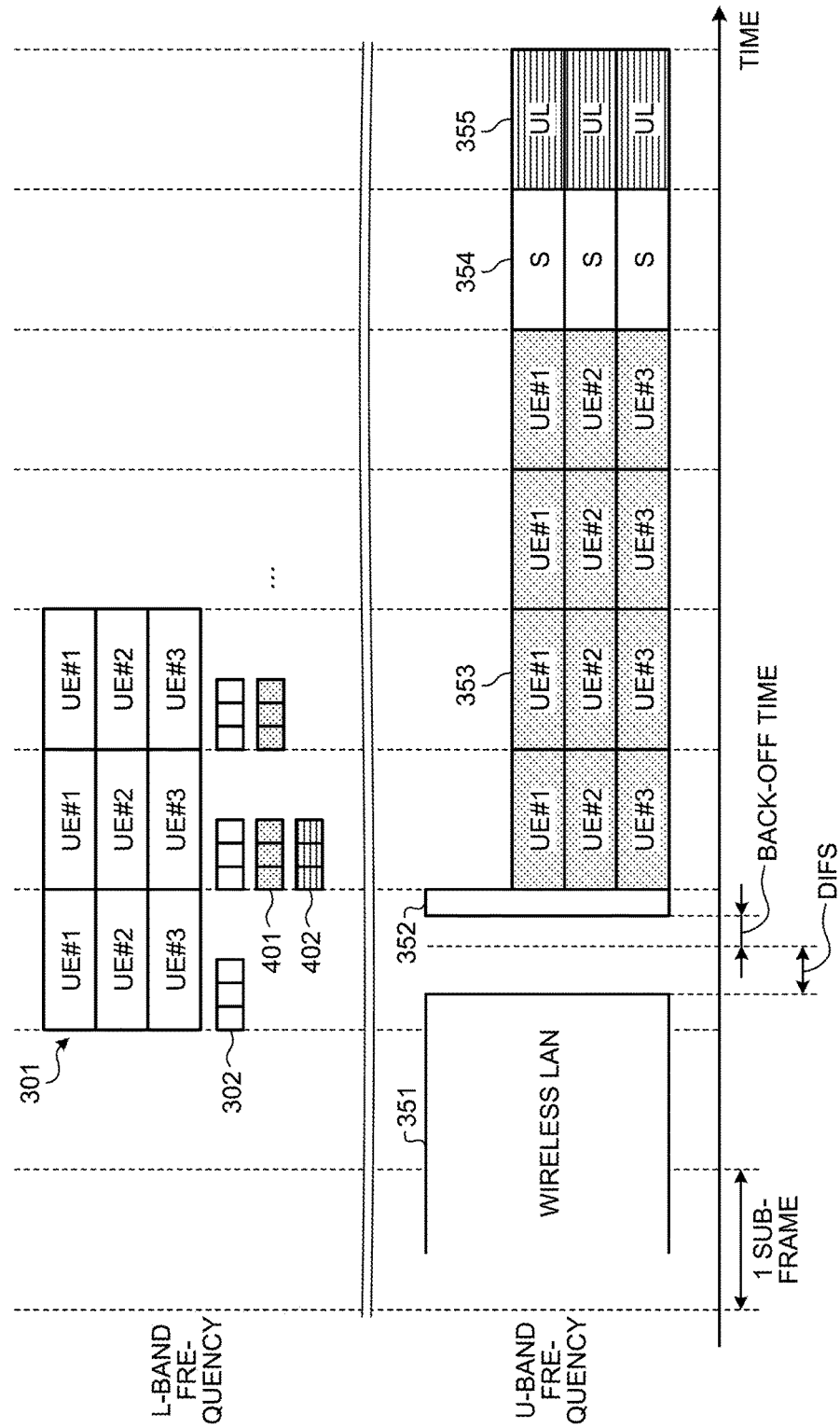
FIG. 5 is a diagram illustrating a specific example of a sub-frame configuration according to a second embodiment.

Next, a specific example of the sub-frame configuration in the wireless communication system in the second embodiment will be described with reference to FIG. 5. FIG. 5 is a diagram illustrating in time series the data to be transmitted by using the respective frequency bands of the L-band and the U-band. In FIG. 5, the portions the same as those in FIG. 4 are denoted by the same reference signs, and the detailed explanations thereof are omitted.

In the L-band, as with the first embodiment, the data 301 in which the data addressed to the three terminal devices UE #1 to #3 has been frequency-multiplexed and the DL assignment 302 concerning the data 301 are transmitted. In the frequencies in the EPDCCH area of the L-band different from the frequency to which the DL assignment 302 is arranged, DL assignment 401 of the U-band and UL grant 402 are arranged and transmitted. That is, the DL assignment 401 and the UL grant 402 are arranged to the frequencies different from each other in the EPDCCH area. The terminal devices UE #1 to #3 each can understand, by receiving and decoding the DL assignment 401 in the EPDCCH area, which sub-band in the U-band the data addressed to the terminal devices themselves is allocated to. The terminal devices UE #1 to #3 can further understand, by receiving and decoding the UL grant 402 in the EPDCCH area, the presence of permission of data transmission of uplink using the U-band.

As just described, in the EPDCCH area of the L-band, arranged to the frequencies different from one another and transmitted are the L-band DCI 302, the DL assignment 401 of the U-band, and the UL grant 402 of the U-band. Thus, the base station apparatus can keep the L-band DCI 302, the DL assignment 401 of the U-band, and the UL grant 402 of the U-band mapped in advance and, depending on the result of carrier sense, transmit only the L-band DCI 302 and transmit the DCI on both bands. Furthermore, when the data transmission of uplink in the U-band is not permitted while the data transmission of downlink in the U-band is permitted for example, the base station apparatus can also transmit only the DL assignment 401 out of the U-band DCI. Then, the base station apparatus can temporarily retain the UL grant 402 mapped in advance and, when the data transmission of uplink in the U-band is permitted, transmit the retained UL grant 402.

As in the foregoing, according to the second embodiment, the L-band DCI and the U-band DCI are arranged to the frequencies different from each other in the EPDCCH area of the L-band and transmitted. Furthermore, the DL assignment and the UL grant out of the U-band DCI also are arranged to the frequencies different from each other in the EPDCCH area. Consequently, as a result of carrier sense, even when the data transmission of uplink is not executed while the data transmission of downlink using the U-band is executed for example, the DL assignment mapped in advance can be transmitted independently from the UL grant. Furthermore, the UL grant mapped in advance can be retained temporarily, and as a result of carrier sense, when the data transmission of uplink using the U-band is executed, the retained U-band DCI can be transmitted. Accordingly, when the communication is performed by using a frequency band that needs a license and a frequency band that needs no license, it is possible to transmit the control information efficiently.

In the above-described second embodiment, it has been exemplified that the DL assignment and the UL grant included in the U-band DCI and the L-band DCI are arranged to different frequencies in the EPDCCH area of the L-band. However, the same effect can be obtained as long as they are being arranged to different areas.

[c] Third Embodiment

The feature of a third embodiment is the point that the UL grant indicative of the transmission permission of data of uplink in the U-band is arranged in the U-band.

The configurations of the base station apparatus and the terminal device according to the third embodiment are the same as those of the base station apparatus 100 and the terminal device 200 in the first embodiment, and thus the explanations thereof are omitted. In the third embodiment, the operation of the EPDCCH generator 112 of the base station apparatus 100 is different from that of the first embodiment.

The EPDCCH generator 112 arranges, in the EPDCCH area of the L-band and a certain control channel area of the U-band, the U-band DCI and the L-band DCI that are output from the U-band mapping unit 110 and the L-band mapping unit 111, respectively. At this time, the EPDCCH generator 112 allocates, to sub-carriers of frequencies different from each other in the EPDCCH area of the L-band, the REG in which the DL assignment out of the U-band DCI is mapped and the REG in which the L-band DCI is mapped. The EPDCCH generator 112 further allocates, to a sub-carrier in the certain control channel area of the U-band, the REG in which the UL grant out of the U-band DCI is mapped.

That is, in the third embodiment, the L-band DCI, the DL assignment of the U-band, and the UL grant of the U-band are arranged to the frequencies different from one another. At this time, the UL grant of the U-band is arranged not to the frequency in the EPDCCH area of the L-band but to a frequency in the certain control channel area of the U-band. Accordingly, it is possible to cut down the resources used in the EPDCCH of the L-band that needs a license, and to reduce the overhead.

Figure 6:
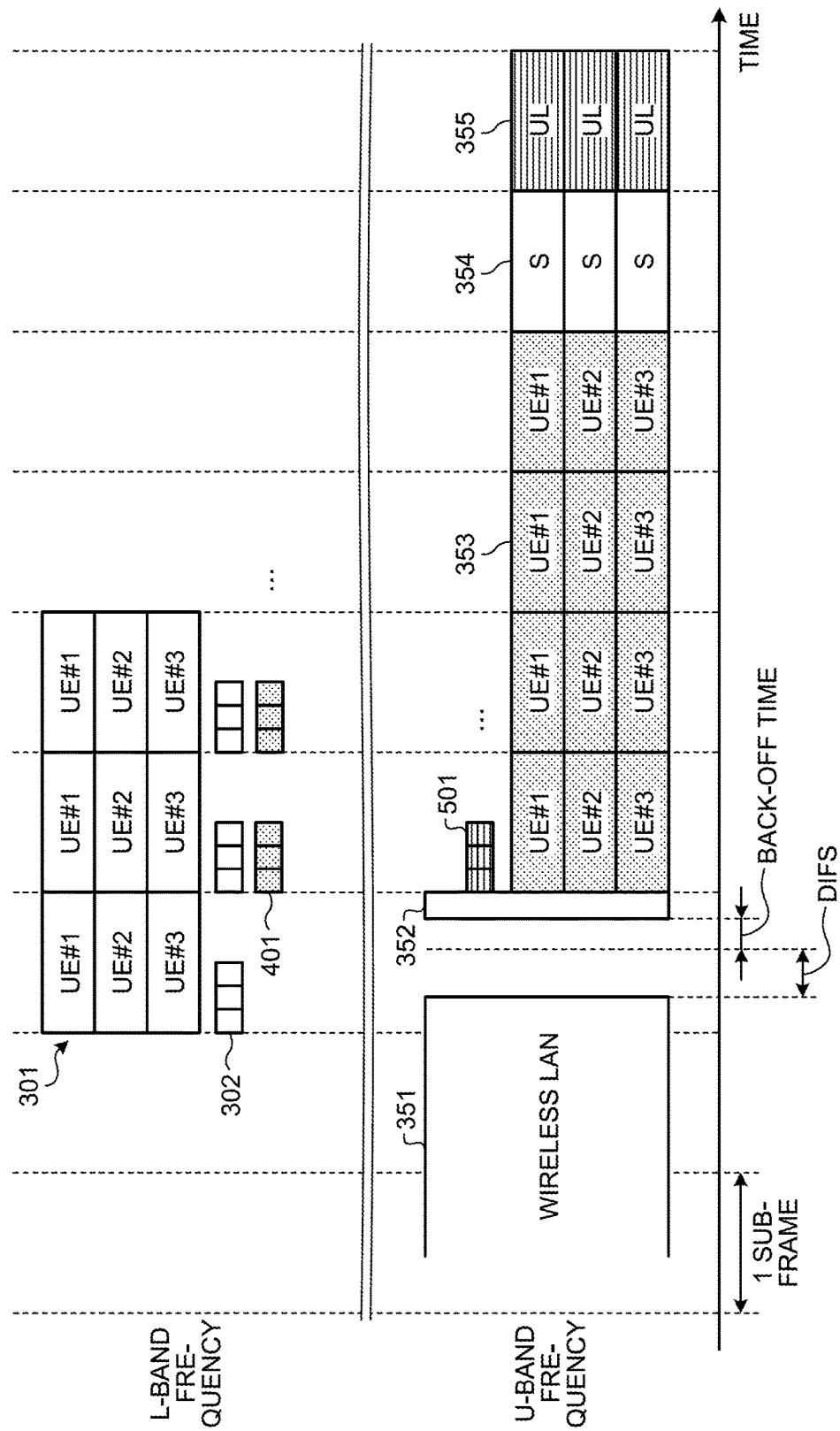
FIG. 6 is a diagram illustrating a specific example of a sub-frame configuration according to a third embodiment.

Next, a specific example of the sub-frame configuration in the wireless communication system in the third embodiment will be described with reference to FIG. 6. FIG. 6 is a diagram illustrating in time series the data to be transmitted by using the respective frequency bands of the L-band and the U-band. In FIG. 6, the portions the same as those in FIGS. 4 and 5 are denoted by the same reference signs, and the detailed explanations thereof are omitted.

In the L-band, as with the first embodiment, the data 301 in which the data addressed to the three terminal devices UE #1 to #3 has been frequency-multiplexed and the DL assignment 302 concerning the data 301 are transmitted. In the frequency in the EPDCCH area of the L-band different from the frequency to which the DL assignment 302 is arranged, the DL assignment 401 of the U-band is arranged and transmitted. Moreover, in the frequency in the certain control channel area of the U-band, UL grant 501 of the U-band is arranged and transmitted. That is, the UL grant 501 is arranged not in the EPDCCH of the L-band but in the U-band. The terminal devices UE #1 to #3 each can understand, by receiving and decoding the DL assignment 401 in the EPDCCH area, which sub-band in the U-band the data addressed to the terminal devices themselves is allocated to. The terminal devices UE #1 to #3 can further understand, by receiving and decoding the UL grant 501 in the certain control channel area of the U-band, the presence of the permission of data transmission of uplink using the U-band.

As just described, in the EPDCCH area of the L-band, the L-band DCI 302 and the DL assignment 401 of the U-band are arranged to the frequencies different from each other and transmitted, and in the certain control channel area of the U-band, the UL grant 501 of the U-band is arranged and transmitted. Thus, the base station apparatus can keep the L-band DCI 302, the DL assignment 401 of the U-band, and the UL grant 501 of the U-band mapped in advance and, depending on the result of carrier sense, transmit only the L-band DCI 302 and transmit the DCI on both bands. Furthermore, when the data transmission of uplink in the U-band is not permitted while the data of downlink in the U-band is transmitted for example, the base station apparatus can also transmit only the DL assignment 401 out of the U-band DCI. Then, the base station apparatus can temporarily retain the UL grant 501 mapped in advance and, when the data transmission of uplink in the U-band is permitted, transmit the retained UL grant 501 by using the U-band.

As in the foregoing, according to the third embodiment, the L-band DCI and the U-band DCI are arranged to frequencies different from one another in the EPDCCH area of the L-band and the certain control channel area of the U-band and transmitted. Furthermore, the UL grant out of the U-band DCI is arranged in the certain control channel area of the U-band and transmitted. Accordingly, it is possible to cut down the DCI arranged in the EPDCCH area of the L-band, and to reduce the overhead in the EPDCCH.

In the above-described third embodiment, it has been exemplified that the L-band DCI and the DL assignment included in the U-band DCI are arranged to different frequencies in the EPDCCH area of the L-band. However, the same effect can be obtained as long as they are being arranged to different areas.

[d] Fourth Embodiment

The feature of a fourth embodiment is the point that the DL assignment indicative of the allocation of data of downlink in the U-band and the UL grant indicative of the transmission permission of data of uplink in the U-band are arranged to different frequencies in the U-band.

The configurations of the base station apparatus and the terminal device according to the fourth embodiment are the same as those of the base station apparatus 100 and the terminal device 200 in the first embodiment, and thus the explanations thereof are omitted. In the fourth embodiment, the operation of the EPDCCH generator 112 of the base station apparatus 100 is different from that of the first embodiment.

The EPDCCH generator 112 arranges, in the EPDCCH area of the L-band and a certain control channel area of the U-band, the U-band DCI and the L-band DCI that are output from the U-band mapping unit 110 and the L-band mapping unit 111, respectively. At this time, the EPDCCH generator 112 allocates the REG, in which the L-band DCI is mapped, to a sub-carrier in the EPDCCH area of the L-band. The EPDCCH generator 112 further allocates the REG, in which the U-band DCI is mapped, to sub-carriers of frequencies different from each other in the certain control channel area of the U-band. That is, the EPDCCH generator 112 arranges the DL assignment and the UL grant in the U-band to the frequencies different from each other in the certain control channel area of the U-band.

In the fourth embodiment, while the L-band DCI is arranged in the L-band, the U-band DCI is arranged in the U-band. At this time, the DL assignment and the UL grant included in the U-band DCI are arranged to the frequencies different from each other in the certain control channel area. Accordingly, it is possible to cut down the resources used in the EPDCCH of the L-band that needs a license, and to reduce the overhead.

Figure 7:
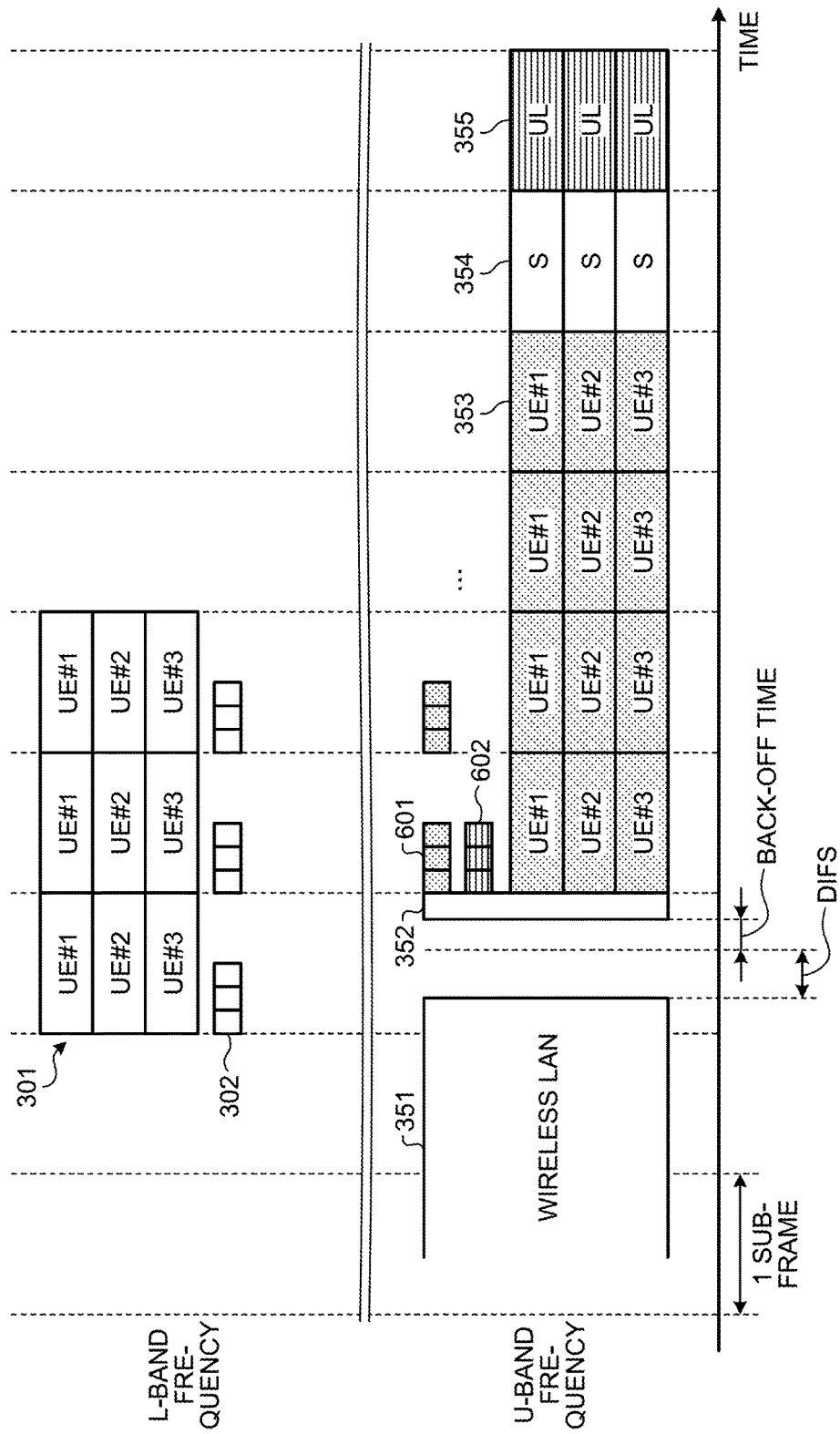
FIG. 7 is a diagram illustrating a specific example of a sub-frame configuration according to a fourth embodiment.

Next, a specific example of the sub-frame configuration in the wireless communication system in the fourth embodiment will be described with reference to FIG. 7. FIG. 7 is a diagram illustrating in time series the data to be transmitted by using the respective frequency bands of the L-band and the U-band. In FIG. 7, the portions the same as those in FIG.

4 are denoted by the same reference signs, and the detailed explanations thereof are omitted.

In the L-band, as with the first embodiment, the data 301 in which the data addressed to the three terminal devices UE #1 to #3 has been frequency-multiplexed and the DL assignment 302 concerning the data 301 are transmitted. The DL assignment 302 is arranged in the EPDCCH area of the L-band and transmitted.

Meanwhile, in the frequencies in the certain control channel area of the U-band, the U-band DCI is arranged and transmitted. Specifically, DL assignment 601 and UL grant 602 of the U-band are arranged to the frequencies different from each other in the certain control channel area of the U-band, and transmitted. That is, the DL assignment 601 and the UL grant 602 are arranged not in the EPDCCH area of the L-band but in the U-band. The terminal devices UE #1 to #3 each can understand, by receiving and decoding the DL assignment 601 in the certain control channel area of the U-band, which sub-band in the U-band the data addressed to the terminal devices themselves is allocated to. The terminal devices UE #1 to #3 can further understand, by receiving and decoding the UL grant 602 in the certain control channel area of the U-band, the presence of the permission of data transmission of uplink using the U-band.

As just described, in the EPDCCH area of the L-band, the L-band DCI 302 is arranged and transmitted, and in the certain control channel area of the U-band, the DL assignment 601 and the UL grant 602 of the U-band are arranged to the frequencies different from each other and transmitted. Thus, the base station apparatus can keep the L-band DCI 302, the DL assignment 601 of the U-band, and the UL grant 602 of the U-band mapped in advance and, depending on the result of carrier sense, transmit only the L-band DCI 302 and transmit the DCI on both bands. Furthermore, when the data transmission of uplink in the U-band is not permitted while the data of downlink in the U-band is transmitted for example, the base station apparatus can also transmit only the DL assignment 601 out of the U-band DCI. Then, the base station apparatus can temporarily retain the UL grant 602 mapped in advance and, when the data transmission of uplink in the U-band is permitted, transmit the retained UL grant 602 by using the U-band.

As in the foregoing, according to the fourth embodiment, the L-band DCI and the U-band DCI are arranged to the frequencies different from each other in the EPDCCH area of the L-band and the certain control channel area of the U-band and transmitted. Furthermore, the DL assignment and the UL grant included in the U-band DCI are arranged to the frequencies different from each other in the certain control channel area of the U-band. Accordingly, it is possible to cut down the DCI arranged in the EPDCCH area of the L-band, and to reduce the overhead in the EPDCCH.

In the above-described fourth embodiment, it has been exemplified that the DL assignment and the UL grant included in the U-band DCI are arranged to different frequencies in the certain control channel area of the U-band. However, the same effect can be obtained as long as they are being arranged to different areas.

[e] Fifth Embodiment

The feature of a fifth embodiment is the point that the DL assignment indicative of the allocation of data of downlink in the U-band and the UL grant indicative of the transmission permission of data of uplink in the U-band are arranged to an identical frequency in the U-band.

The configurations of the base station apparatus and the terminal device according to the fifth embodiment are the same as those of the base station apparatus 100 and the terminal device 200 in the first embodiment, and thus the explanations thereof are omitted. In the fifth embodiment, the operation of the EPDCCH generator 112 of the base station apparatus 100 is different from that of the first embodiment.

The EPDCCH generator 112 arranges, in the EPDCCH area of the L-band and a certain control channel area of the U-band, the U-band DCI and the L-band DCI that are output from the U-band mapping unit 110 and the L-band mapping unit 111, respectively. At this time, the EPDCCH generator 112 allocates the REG, in which the L-band DCI is mapped, to a sub-carrier in the EPDCCH area of the L-band. The EPDCCH generator 112 further allocates, to a sub-carrier in the certain control channel area of the U-band, the REG in which the U-band DCI is mapped. That is, the EPDCCH generator 112 time-multiplexes the DL assignment and the UL grant in the U-band and arranges them to an identical frequency in the certain control channel area of the U-band.

In the fifth embodiment, while the L-band DCI is arranged in the L-band, the U-band DCI is arranged in the U-band. At this time, the DL assignment and the UL grant included in the U-band DCI are time-multiplexed and are arranged to the identical frequency in the certain control channel area. Accordingly, it is possible to cut down the resources used in the EPDCCH of the L-band that needs a license, and to reduce the overhead. Furthermore, the terminal device can understand, by decoding the U-band DCI in a single frequency in the certain control channel area of the U-band, the allocation location of data of downlink and the presence of the transmission permission of uplink.

Figure 8:
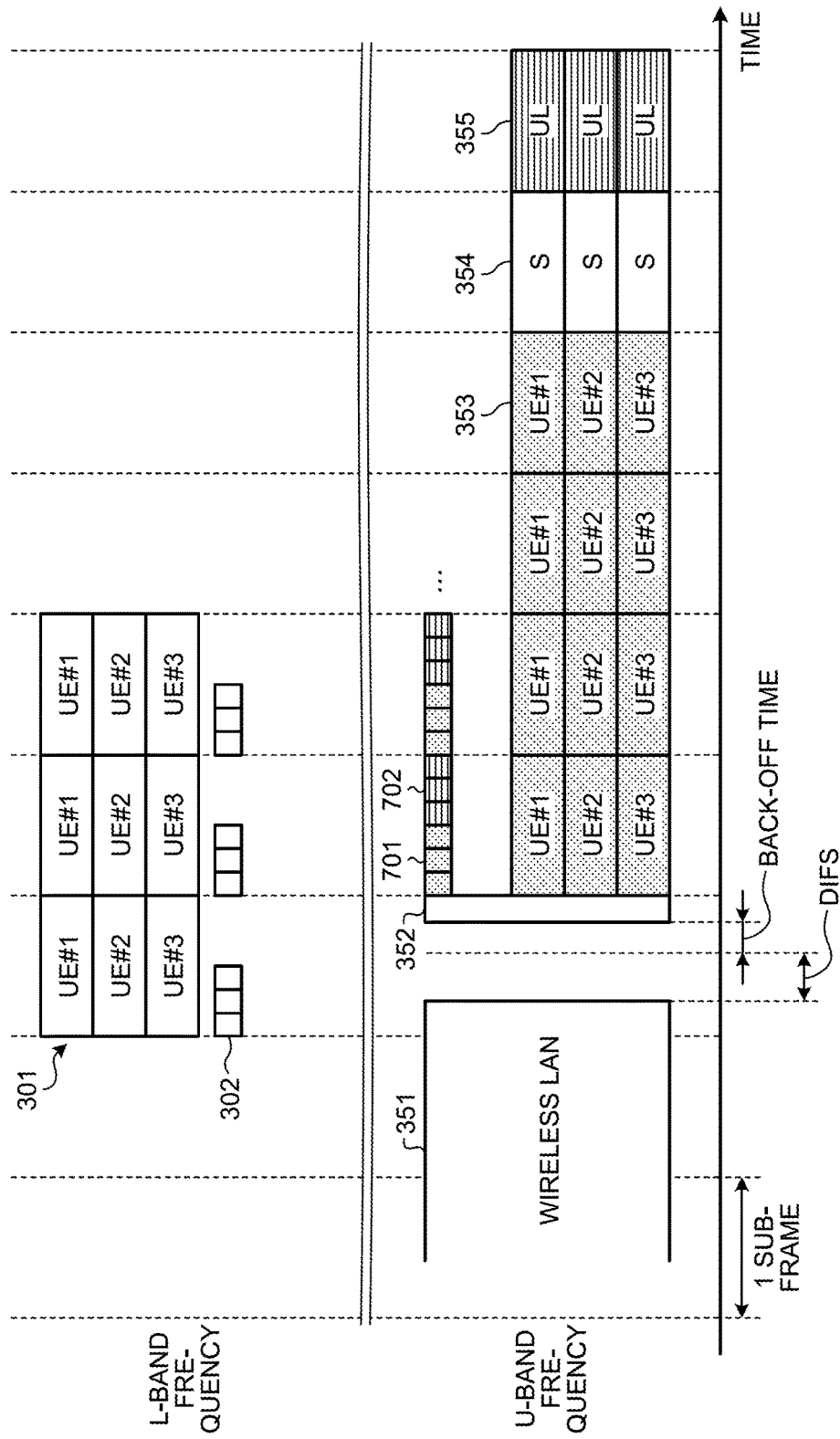
FIG. 8 is a diagram illustrating a specific example of a sub-frame configuration according to a fifth embodiment.

Next, a specific example of the sub-frame configuration in the wireless communication system in the fifth embodiment will be described with reference to FIG. 8. FIG. 8 is a diagram illustrating in time series the data to be transmitted by using the respective frequency bands of the L-band and the U-band. In FIG. 8, the portions the same as those in FIG. 4 are denoted by the same reference signs, and the detailed explanations thereof are omitted.

In the L-band, as with the first embodiment, the data 301 in which the data addressed to the three terminal devices UE #1 to #3 has been frequency-multiplexed and the DL assignment 302 concerning the data 301 are transmitted. The DL assignment 302 is arranged in the EPDCCH area of the L-band and transmitted.

Meanwhile, in the frequency in the certain control channel area of the U-band, the U-band DCI is arranged and transmitted. Specifically, DL assignment 701 and UL grant 702 of the U-band are time-multiplexed, and are arranged to an identical frequency in the certain control channel area of the U-band and transmitted. That is, the DL assignment 701 and the UL grant 702 are arranged not in the EPDCCH area of the L-band but in the U-band. The terminal devices UE #1 to #3 each can understand, by receiving and decoding the DL assignment 701 in the certain control channel area of the U-band, which sub-band in the U-band the data addressed to the terminal devices themselves is allocated to. The terminal devices UE #1 to #3 can further understand, by receiving and decoding the UL grant 702 in the certain control channel area of the U-band, the presence of the permission of data transmission of uplink using the U-band.

As just described, in the EPDCCH area of the L-band, the L-band DCI 302 is arranged and transmitted, and in the certain control channel area of the U-band, the DL assignment 701 and the UL grant 702 of the U-band are arranged to an identical frequency and transmitted. Thus, the base station apparatus can keep the L-band DCI 302, the DL assignment 701 of the U-band, and the UL grant 702 of the U-band mapped in advance and, depending on the result of carrier sense, transmit only the L-band DCI 302 and transmit the DCI on both bands. That is, when the U-band is not vacant as a result of carrier sense for example, the base station apparatus can transmit only the L-band DCI 302. Then, the base station apparatus can temporarily retain the DL assignment 701 and the UL grant 702 that are of the U-band and are mapped in advance and, when the U-band turns vacant, transmit the retained DL assignment 701 and the UL grant 702 by using the U-band.

As in the foregoing, according to the fifth embodiment, the L-band DCI and the U-band DCI are arranged to the frequencies different from each other in the EPDCCH area of the L-band and the certain control channel area of the U-band and transmitted. Furthermore, the DL assignment and the UL grant included in the U-band DCI are arranged to the identical frequency in the certain control channel area of the U-band and transmitted. Accordingly, it is possible to cut down the DCI arranged in the EPDCCH area of the L-band, and to reduce the overhead in the EPDCCH. The terminal device can decode the DL assignment and the UL grant from a single frequency of the U-band.

In the above-described fifth embodiment, it has been exemplified that the DL assignment and the UL grant included in the U-band DCI are arranged to an identical frequency in the certain control channel area of the U-band. However, the same effect can be obtained as long as they are being arranged to an identical area.

Figure 9:
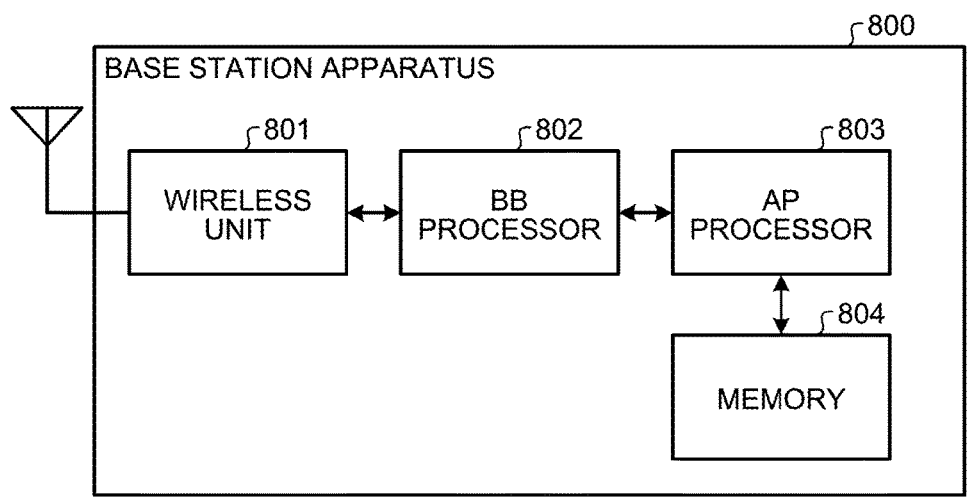
FIG. 9 is a block diagram illustrating an example of a hardware configuration of the base station apparatus.

The transmission processing of the DCI explained in the above-described respective embodiments can be executed, by a base station apparatus 800 having a hardware configuration that is illustrated in FIG. 9, for example. The base station apparatus 800 illustrated in FIG. 9 includes a wireless unit 801, a baseband processor (hereinafter abbreviated as "BB processor") 802, an application processor (hereinafter abbreviated as "AP processor") 803, and a memory 804.

The wireless unit 801 transmits a wireless signal including the DCI via an antenna. The wireless unit 801 receives a wireless signal via the antenna. The wireless unit 801 then executes certain wireless transmitting processing and executes certain wireless receiving processing. The wireless unit 801 corresponds to the L-band receiver 101, the U-band receiver 102, the L-band transmitter 117, and the U-band transmitter 118 of the base station apparatus 100 illustrated in FIG. 1, for example.

The BB processor 802 executes baseband processing on the signal transmitted and received. That is, the BB processor 802 executes modulation and demodulation, and encoding and decoding of signals, for example. The BB processor 802 corresponds to the CP removal units 103 and 104, the FFT units 105 and 106, the channel separator 107, the decoder 108, the U-band vacancy determining unit 109, the U-band mapping unit 110, the L-band mapping unit 111, the EPDCCH generator 112, the IFFT units 113 and 114, and the CP adding units 115 and 116 of the base station apparatus 100 illustrated in FIG. 1, for example.

The AP processor 803 executes processing of applications. That is, the AP processor 803 executes the processing using decoded data obtained in the BB processor 802 and executes the processing of determining the content of the DCI. The memory 804 stores therein data and others that are used when the AP processor 803 executes the processing.

According to one aspect of the wireless communication system, the base station apparatus, the terminal device, and the transmission method that are disclosed in the present application, it has an effect in that, in performing the communication by using a frequency band that needs a license and a frequency band that needs no license, it is possible to transmit the control information efficiently.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a base station apparatus; and
a terminal device,
the base station apparatus comprising:
    a processor that executes a process including
        mapping first control information concerning a first frequency band which needs a license to use for wireless communication,
        mapping second control information concerning a second frequency band which does not need the license to use for the wireless communication, and
        generating a control channel signal by arranging, in different areas each of which is included in a control channel, the first control information and the second control information; and
    a transmitter that transmits the control channel signal generated by the processor to the terminal device.

2. The wireless communication system according to claim 1, wherein
the process further including determining whether the second frequency band is vacant, and
the generating includes generating the control channel signal by arranging the first control information and the second control information in the areas different from each other when it is determined that the second frequency band is vacant, and generating the control signal by using the first control information when it is determined that the second frequency band is not vacant.

3. The wireless communication system according to claim 2, wherein the mapping second control information includes retaining the mapped second information when it is determined that the second frequency band is not vacant.

4. The wireless communication system according to claim 1, wherein the generating includes generating the control channel signal by arranging the first control information and the second control information in the different areas in a control channel area of the first frequency band.

5. The wireless communication system according to claim 1, wherein the generating includes generating the control channel signal by arranging the first control information in a control channel area of the first frequency band and by arranging the second control information in a control channel area of the second frequency band.

6. The wireless communication system according to claim 1, wherein the mapping second control information includes mapping downlink control information indicative of data allocation of downlink in the second frequency band, and the generating includes generating the control channel signal by arranging the downlink control information in an area different from an area that the first control information is arranged.

7. The wireless communication system according to claim 1, wherein the mapping second control information includes mapping uplink control information indicative of presence of permission of data transmission of uplink in the second frequency band, and the generating includes generating the control channel signal by arranging the uplink control information in an area different from an area that the first control information is arranged.

8. The wireless communication system according to claim 1, wherein the mapping second control information includes mapping downlink control information indicative of data allocation of downlink in the second frequency band and uplink control information indicative of presence of permission of data transmission of uplink in the second frequency band, and the generating includes generating the control channel signal by arranging the downlink control information and the uplink control information in an area different from an area that the first control information is arranged.

9. The wireless communication system according to claim 8, wherein the generating includes generating the control channel signal by arranging the downlink control information and the uplink control information in an identical area in a control channel area of the first frequency band.

10. The wireless communication system according to claim 8, wherein the generating includes generating the control channel signal by arranging the downlink control information and the uplink control information in the different areas in a control channel area of the first frequency band.

11. The wireless communication system according to claim 8, wherein the generating includes generating the control channel signal by arranging the downlink control information in a control channel area of the first frequency band and by arranging the uplink control information in a control channel area of the second frequency band.

12. The wireless communication system according to claim 8, wherein the generating includes generating the control channel signal by arranging the downlink control information and the uplink control information in an identical area in a control channel area of the second frequency band.

13. The wireless communication system according to claim 8, wherein the generating includes generating the control channel signal by arranging the downlink control information and the uplink control information in the different areas in a control channel area of the second frequency band.

14. A base station apparatus comprising:
a processor that executes a process including:
mapping first control information concerning a first frequency band which needs a license to use for wireless communication;
mapping second control information concerning a second frequency band which does not need the license to use for the wireless communication;
generating a control channel signal by arranging, in different areas each of which is included in a control channel, the first control information and the second control information; and
a transmitter that transmits the control channel signal generated by the processor.

15. A terminal device comprising:
a receiver that receives a control channel signal in which first control information concerning a first frequency band which needs a license to use for wireless communication and second control information concerning a second frequency band which does not need the license to use for the wireless communication are arranged in areas different from each other; and
a decoder that decodes the control channel signal received by the receiver and, based on a result of decoding, decodes data received in the first frequency band and the second frequency band.

16. A transmission method performed in a base station apparatus belonging to a wireless communication system, the transmission method comprising:
mapping first control information concerning a first frequency band which needs a license to use for wireless communication;
mapping second control information concerning a second frequency band which does not need the license to use for the wireless communication;
generating a control channel signal by arranging, in different areas each of which is included in a control channel, the first control information and the second control information; and
transmitting the generated control channel signal.

* * * * *